(12) United States Patent
Ge et al.

(10) Patent No.: US 10,790,763 B2
(45) Date of Patent: Sep. 29, 2020

(54) HEV E-DRIVES WITH HV BOOST RATIO AND WIDE DC BUS VOLTAGE RANGE

(71) Applicant: Ford Global Technologies, LLC, Dearborn, MI (US)

(72) Inventors: Baoming Ge, Okemos, MI (US); Lihua Chen, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 168 days.

(21) Appl. No.: 16/005,937

(22) Filed: Jun. 12, 2018

(65) Prior Publication Data

US 2019/0379296 A1 Dec. 12, 2019

(51) Int. Cl.
| | |
|---|---|
| *H02M 3/155* | (2006.01) |
| *H02M 7/483* | (2007.01) |
| *B60L 50/51* | (2019.01) |
| *H02M 3/156* | (2006.01) |
| *H02M 3/158* | (2006.01) |
| *H02M 3/157* | (2006.01) |

(52) U.S. Cl.
CPC .............. *H02M 7/483* (2013.01); *B60L 50/51* (2019.02); *B60L 2210/12* (2013.01); *B60L 2210/14* (2013.01); *B60L 2210/42* (2013.01); *B60L 2240/527* (2013.01); *H02M 3/155* (2013.01); *H02M 3/156* (2013.01); *H02M 3/157* (2013.01); *H02M 3/158* (2013.01); *H02M 3/1563* (2013.01); *H02M 3/1582* (2013.01); *H02M 3/1584* (2013.01); *H02M 3/1588* (2013.01); *H02M 2007/4835* (2013.01)

(58) Field of Classification Search
CPC ......... H02M 3/155–1588; H02M 3/07; H02M 3/24; H02M 3/335; H02M 3/158; H02M 3/33576; H02M 7/5387; H02M 7/53873; H02M 7/217; H02M 7/219; H02M 7/48; H02M 1/00; H02M 1/14; H02M 2001/0003; H02M 2001/007
USPC .................................................... 363/123–125
See application file for complete search history.

(56) References Cited

U.S. PATENT DOCUMENTS

| | | | |
|---|---|---|---|
| 9,088,224 B2 * | 7/2015 | Chen ..................... | H02M 3/155 |
| 9,399,407 B2 | 7/2016 | Zhou et al. | |
| 9,656,556 B2 * | 5/2017 | Syed ..................... | B60L 11/005 |
| 9,849,806 B1 | 12/2017 | Xu et al. | |
| 9,855,850 B2 | 1/2018 | Chen et al. | |
| 2011/0170318 A1 * | 7/2011 | Chen ...................... | B60L 50/61 |
| | | | 363/16 |
| 2015/0202967 A1 * | 7/2015 | Syed ...................... | B60L 50/40 |
| | | | 320/166 |
| 2016/0318404 A1 * | 11/2016 | Kumazawa ......... | B60L 11/1807 |
| 2017/0222641 A1 * | 8/2017 | Zou ..................... | B60L 11/1803 |
| 2017/0265337 A1 * | 9/2017 | Lei ........................ | H02M 7/003 |
| 2017/0347484 A1 * | 11/2017 | Lei .......................... | B60K 6/48 |
| 2018/0099574 A1 * | 4/2018 | Zhou .................... | H02M 7/5387 |

(Continued)

*Primary Examiner* — Thienvu V Tran
*Assistant Examiner* — Nusrat Quddus
(74) *Attorney, Agent, or Firm* — David B. Kelley; Brooks Kushman P.C.

(57) ABSTRACT

A system includes a bus, and a variable voltage converter (VVC) having a switch in series with a capacitor, and an inductor in parallel with the capacitor and switch, and configured such that operation of the switch in boost mode over a duty cycle range from 0 to less than 0.5 results in a corresponding voltage output to the bus from 0 to a maximum of the VVC.

10 Claims, 7 Drawing Sheets

(56) References Cited

U.S. PATENT DOCUMENTS

| | | | |
|---|---|---|---|
| 2018/0154787 A1* | 6/2018 | Chen | B60L 11/1816 |
| 2018/0194234 A1* | 7/2018 | Xu | H02P 6/14 |
| 2018/0198378 A1* | 7/2018 | Xu | B60L 15/007 |
| 2018/0198401 A1* | 7/2018 | Thongam | B60L 7/14 |
| 2018/0354372 A1* | 12/2018 | Yang | B60L 11/1803 |
| 2019/0111911 A1* | 4/2019 | Wang | B60W 20/14 |
| 2019/0181766 A1* | 6/2019 | Ge | H02M 3/1584 |

\* cited by examiner

HEV E-DRIVES WITH HV BOOST RATIO AND WIDE DC BUS VOLTAGE RANGE

TECHNICAL FIELD

The present disclosure relates to systems and methods for operating a vehicle variable voltage converter.

BACKGROUND

The term "electric vehicle" can be used to describe vehicles having at least one electric motor for vehicle propulsion, such as battery electric vehicles (BEV) and hybrid electric vehicles (HEV). A BEV includes at least one electric motor, wherein the energy source for the motor is a battery that is re-chargeable from an external electric grid. An HEV includes an internal combustion engine and one or more electric motors, wherein the energy source for the engine is fuel and the energy source for the motors is a battery. The HEV battery may be a larger capacity battery that is rechargeable from the external electric grid and may serve as the main source of energy for vehicle propulsion until the battery depletes to a low energy level, at which time the HEV may at least partly rely on the internal combustion engine for vehicle propulsion. HEV also has generator which generates electricity from engine.

SUMMARY

A system includes a bus, and a variable voltage converter (VVC) having a switch in series with a capacitor, and an inductor in parallel with the capacitor and switch, and being configured such that operation of the switch in boost mode over a duty cycle range from 0 to less than 0.5 results in a corresponding voltage output to the bus from 0 to a maximum of the VVC.

A system includes a battery, an inverter, and a variable voltage converter (VVC) connected between the battery and inverter. The VVC includes a pair of switches, a capacitor in series with one of the switches, and an inductor in parallel with the capacitor and the one of the switches, and is configured such that operation of the switches in boost mode over a duty cycle range from 0 to less than 0.5 results in a corresponding voltage output to the inverter in a range from 0 to a maximum of the VVC.

A system includes a bus, and a variable voltage converter (VVC) having a pair of switches, a capacitor in series with one of the switches, and an inductor in parallel with the capacitor and the one of the switches, and being configured such that operation of the switches in boost mode over a duty cycle range from 0 to less than 0.5 results in a corresponding voltage output to the bus from battery voltage to a maximum of the VVC.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A hybrid electric vehicle may include an inverter electrically connected between a traction battery and one or more electric machines, e.g., an electric motor, a generator and so on. Each of the electric machines may operate in a motoring and/or generating mode. In the motoring mode, the electric machine may consume power or energy to propel the vehicle. In the generating mode, the electric machine may produce, or generate, power or energy to charge the traction battery or power other vehicle subsystems.

The inverter may be configured to convert DC output of the traction battery to AC output compatible with the electric machines. The inverter may be further configured to convert AC power output by the electric machines to DC power to charge the traction battery and/or to power other vehicle systems. A voltage converter connected electrically between the traction battery and the inverter may be configured to step up, "boost", and/or step down, "buck", DC energy transferred between the battery and the inverter.

In one example, the voltage converter output may be electrically coupled to the input of the inverter via a DC bus capacitor, a bulk capacitor configured to smooth DC bus voltage. In some instances, minimum voltage across the DC bus, $V_{dc}$, may correspond to the traction battery voltage, $V_{batt}$, such that when the battery voltage is greater than the voltage required by the inverter to output a requested phase-to-phase (hereinafter, phase-phase) voltage, $V_{ph}$, to the electric machine, at least a portion of the DC bus voltage, $V_{dc}$, may be unused thereby causing inefficient system operation, e.g., resulting in high inverter switching and conduction losses.

The stator winding voltage of the electric machine may be proportional to the electric machine rotor speed, such that operating the electric machines at low rotor speed may necessitate stator voltage to be less than a predefined threshold. Amplitude of the phase-phase voltage, $V_{ph}$, output by the inverter may be defined with respect to the DC bus voltage, $V_{dc}$, such that:

$$V_{ph} = \frac{V_{dc}m}{2}\sqrt{3} \quad (1)$$

where m is a modulation index of the inverter.

According to Equation (1), when a minimum DC bus voltage, $V_{dc}$ at a given time corresponds to the battery voltage, $V_{batt}$ at a same time, low phase-phase voltage, $V_{ph}$, output by the inverter may be achieved by lowering the inverter modulation index, m. However, operating the inverter at a low modulation index, m may result in distortion of the current signal output by the inverter to the electric machine or cause other system operation inefficiencies.

Some variable voltage converters (VVCs) may be configured to increase range of the DC bus voltage, $V_{dc}$. For instance, the VVC, whose switches operate in a boost mode, may be configured to output DC bus voltage that ranges between zero volts (V) and a predefined maximum boost voltage of the VVC. In these VVC arrangements, DC bus voltage at the output of the VVC may be adjusted to meet DC bus voltage requirement for a variety of different motor/generator speeds. Said another way, the VVC, whose switches operate in a boost mode, may be configured to output low DC bus voltage such that the motor/generator runs at a low speed, while maximizing the inverter modulation index, m, e.g., by minimizing inverter power losses and phase current total harmonic distortion (THD). Additionally or alternatively, the VVC may be configured to provide voltage boost ratio up to a maximum boost ratio of the VVC while the switches of the VVC are operated at a duty cycle, D less than 0.5, i.e., 50%.

Figure 1:
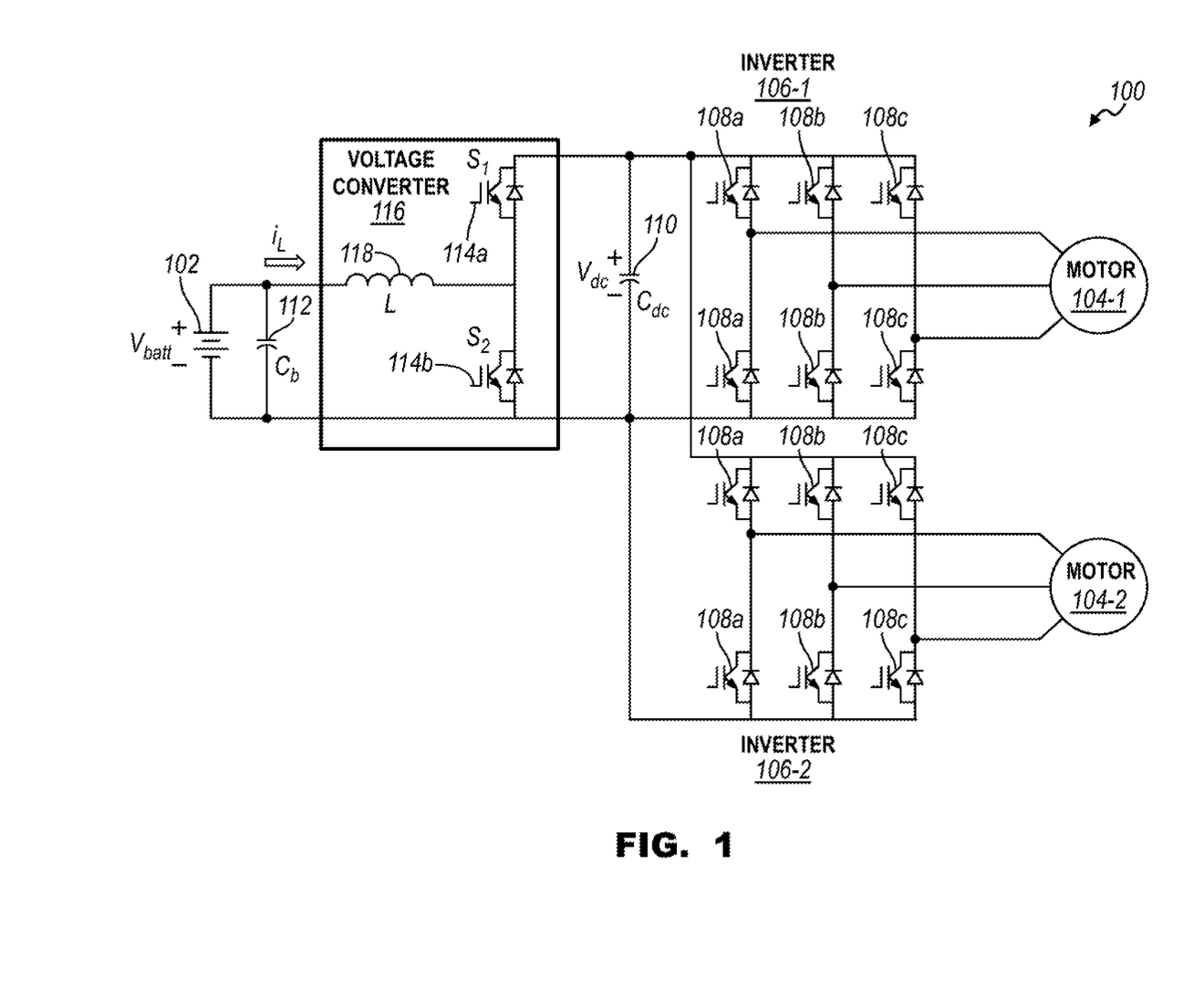
FIG. 1 is a block diagram illustrating a vehicle power transfer system.

FIG. 1 illustrates an example power transfer system 100 for a vehicle. The vehicle may be of various types of passenger vehicles, such as crossover utility vehicle (CUV), sport utility vehicle (SUV), truck, recreational vehicle (RV), boat, plane or other mobile machine for transporting people or goods. The electric machines 104 may be electrically connected to the inverter 106 providing bi-directional energy transfer between the electric machines 104 and at least one traction battery 102. For example, in a motor mode, the inverter 106 may convert direct current (DC) output provided by the traction battery 102 to a three-phase alternating current (AC) as may be required for proper functionality of the electric machines 104. As another example, in a regenerating mode, the inverter 106 may convert the three-phase AC output from the electric machines 104 acting as generators to the DC voltage/current required by the traction battery 102.

In one example, the inverter 106 may include a plurality of power switches 108 configured to provide the three-phase voltages/currents to the electric machines 104. When switching, the power switches 108 may be configured to transfer voltage from a high-voltage DC bus to a corresponding phase input of the electric machines 104. A first pair of switches 108a may be configured to selectively couple a DC bus power and return terminals to a first phase input of the electric machine 104. A second and third pair of switches 108b, 108c may selectively couple corresponding DC bus power and return terminals to the second and third phase inputs of the electric machine 104, respectively.

The switches 108 may include one or more power switching devices. As one example, each of the switches 108 may include one or more IGBTs, MOSFETs, and other solid-state switching devices. Each switch 108 may further include a corresponding control input (e.g., gate input) by which the switch 108 may be operated to switch on and off, or closed and open. Corresponding control inputs of each switch 108 may be electrically coupled to one or more controllers of the vehicle. Accordingly, each of the phase inputs of the electric machine 104 may be selectively coupled to the terminals of the traction battery 102 by a pair of the switches 108. As one example, the switches 108 may be operated such that only one switch 108 of each of the pairs 108a, 108b, and 108c is switched on at a given time.

A variable voltage converter (VVC) 116 may be connected electrically between the traction battery 102 and the inverter 106. The VVC 116 may include a plurality of switches 114 and may be configured to step up, "boost" and/or step down, "buck", DC voltage transferred between the battery 102 and the inverter 106. A capacitor 112 between the traction battery 102 and the VVC 116 may be configured to smooth out switching noise of the switches 114 such that input from the VVC 116 to the traction battery 102 is DC. In one example, the VVC 116 may include an inductor 118 configured to store electric energy when at least one of the switches 114 are turned on and release the stored electric energy when at least one of the switches 114 are turned off. In another example, the VVC 116 may be electrically coupled to the inverter 106 via a DC bus capacitor 110, or a bulk capacitor configured to smooth DC bus voltage that serves as the voltage being input to or output by the inverter 106. In some instances, voltage measured across the DC bus capacitor 110 may be indicative of a DC bus voltage, $V_{dc}$.

The switches $S_1$ 114a and $S_2$ 114b may operate complementary to one another to minimize a possibility of a short-circuit occurrence within the traction battery 102. In one example, the switches $S_1$ 114a and $S_2$ 114b may be said to operate in the buck mode, when the switch $S_1$ 114a operates independently and the switch $S_2$ 114b is activated by a complementary signal. In another example, the switches $S_1$ 114a and $S_2$ 114b may be said to operate in the boost mode, when the switch $S_2$ 114b operates independently and the switch $S_1$ 114a is activated by a complementary signal.

During certain operating scenarios, a requested phase-phase voltage, $V_{ph}$ to be output by the inverter 106 may be less than a predefined threshold. However, as described in reference to at least Equations (2), (3), and (4), achieving a desired phase-phase voltage, $V_{ph}$ when the battery voltage, $V_{batt}$ is greater than 1.15 the desired phase-phase voltage, $V_{ph}$, may affect system performance by upsetting the inverter operating efficiency or causing a degradation in output signal quality. On the other hand, providing the DC bus voltage, $V_{dc}$ at the input to the inverter 106 that is greater than the traction battery 102 voltage, $V_{batt}$, may stress the VVC 116 causing undue component wear and so on.

In one example, the battery 102 output power, $P_{batt}$ may be expressed as follows:

$$P_{batt} = V_{batt} \times I_{batt} \quad (2)$$

where $I_{batt}$ represents output current of the battery 102. The inverter 106 output power, Paw may be such that:

$$P_{inv} = \frac{3 \times I_{ph} \times V_{dc} \times \frac{m}{2}}{\sqrt{2}} \times pf \quad (3)$$

where m represents modulation index, $I_{ph}$ represents the phase current output by the inverter 106, e.g., as measured at the motor 104, and pf represents a power factor, or a ratio of real power flowing to the inverter 106 to the apparent power of the inverter 106. To preserve power efficiency of the power conversion system, output power of the battery 102 must be approximately equal to the output power of the inverter 106 and the Equations (2) and (3) may be combined such that:

$$V_{batt} \times I_{batt} \approx \frac{3 \times I_{ph} \times V_{dc} \times \frac{m}{2}}{\sqrt{2}} \times pf \quad (4)$$

From Equation (4) it follows that, when the power factor, pf and the modulation index, m are approximately equal to one (1) and the DC bus voltage, $V_{dc}$ is approximately equal to the battery voltage, $V_{batt}$, the battery current, $I_{batt}$ may be approximately equal to the phase current $I_{ph}$ output by the inverter 106. Further from Equation (4), achieving the DC bus voltage, $V_{dc}$ that is greater than the battery voltage, $V_{batt}$, may necessitate increasing the battery current, $I_{batt}$.

Signal modulation techniques may include methods for varying one or several characteristics of a modulation signal, $x_c(t)$. Continuous modulation may be defined as:

$$x_c(t) = m \cos(\omega_c t + \varphi(t)) \quad (5)$$

where $\omega_c$ is a fundamental frequency of the load, and $\varphi(t)$ is an instantaneous phase angle.

As shown, for example in Equation (1), the modulation index, m, may be a ratio of phase-phase voltage, $V_{ph}$, output by the inverter with respect to the DC bus voltage, $V_{dc}$. Modulation index, m may be a value between zero (0) and one (1). For example, the modulation index, m, that is approximately equal one (1) may be indicative of a minimum distortion within the current signal output by the inverter 106. As another example, the modulation index, m, that is approaching zero (0) may be indicative of a maximum distortion within the output signal. According to Equation (1), responsive to modulation index, m being approximately equal to one (1), the phase-phase voltage, $V_{ph}$ output by the inverter 106 may be approximately equal to 0.866 of the DC bus voltage, $V_{dc}$ and/or the DC bus voltage, $V_{dc}$ may be approximately equal to 1.15 the phase-phase voltage, $V_{ph}$ output by the inverter 106.

The inverter 106 may be controlled using sinusoidal pulse width modulation (SPWM) or another modulation method. In one example, the inverter 106 may provide an AC output voltage based on a DC input from the VVC 116. The inverter 106 may, for instance, operate the switches 108 to output one or more square pulses of voltage per half cycle to simulate an AC sine wave. In one example, the inverter 106 may be configured to adjust, or modulate, widths of the pulses to regulate the output voltage. As another example, the inverter 106 may be configured to produce a plurality of pulses per one-half cycle of the switches 108. The pulses near the edges of the half-cycle may be narrower than the pulses near the center of the half-cycle such that the pulse widths are proportional to the corresponding amplitude of a sine wave at that portion of the cycle. As still another example, the inverter 106 may be configured to change the effective output voltage by increasing or decreasing the widths of all pulses while maintaining proportionality of the pulses with respect to one another causing output voltage signal to maintain sinusoidal shape.

The inverter 106 may use 'carrier-based' pulse width modulation, meaning the inverter 106 may generate one or more output voltages by applying predefined modulation signals. In sinusoidal PWM, the modulation signal may be sinusoidal, such that a peak of the modulating signal may be less than the peak of the carrier signal.

Figure 2A:
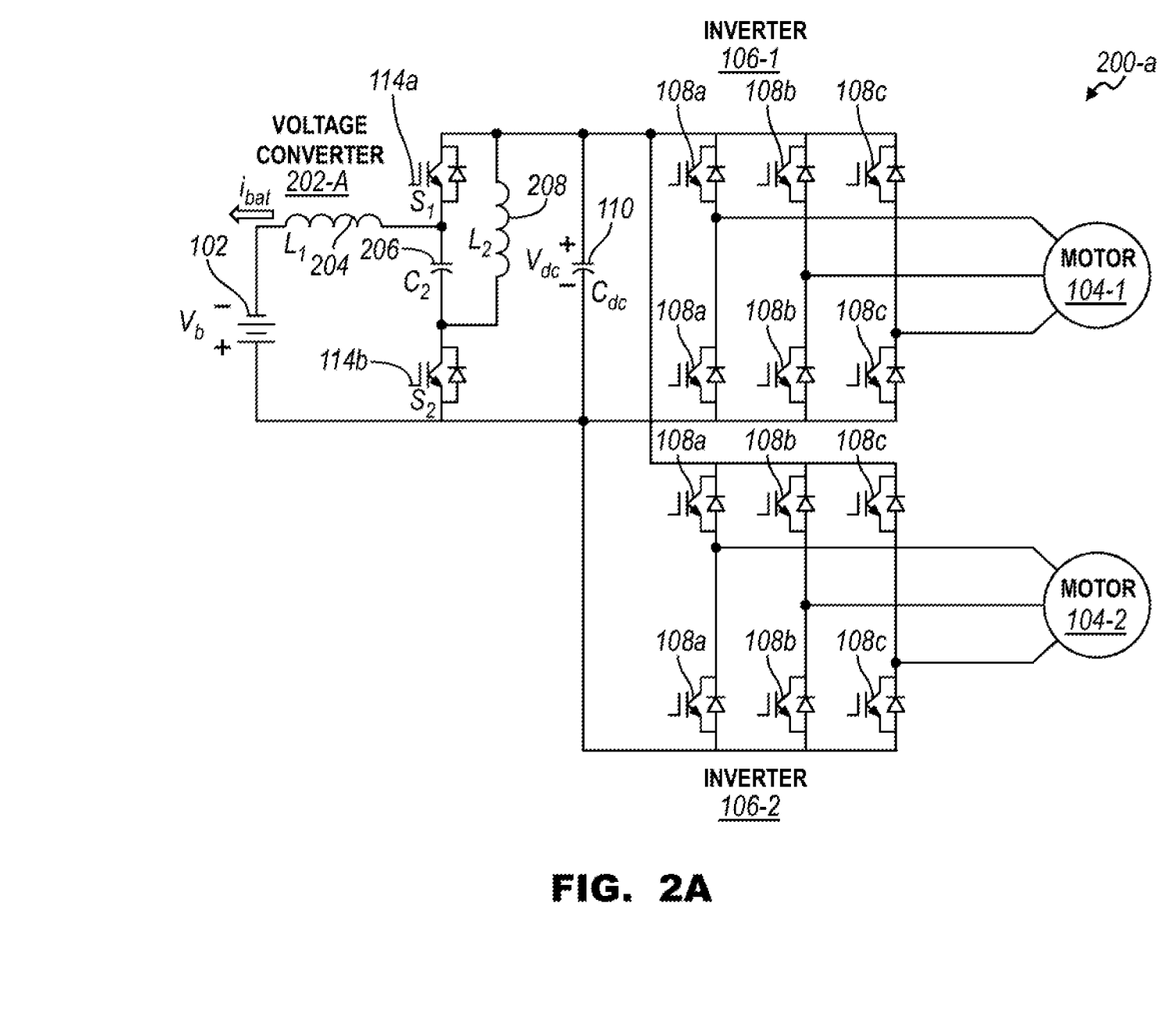
FIGS. 2A-2B are block circuit diagrams illustrating voltage converters having expanded operating voltage range.
Figure 2B:
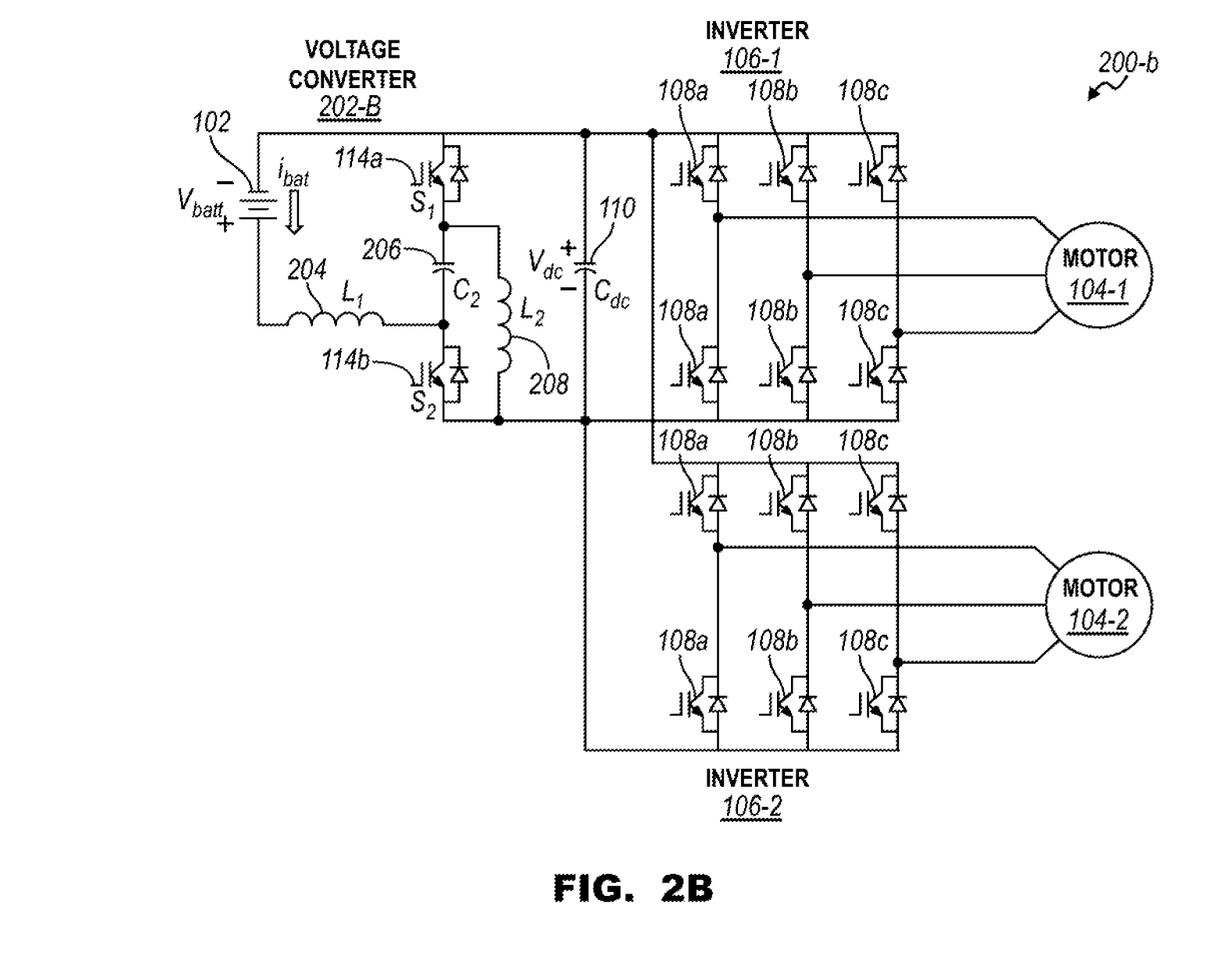

FIGS. 2A and 2B illustrate example power conversion systems 200-A and 200-B, respectively. In one example, the systems 200-A and 200-B may each include a DC bus (illustrated generally as DC bus voltage, $V_{dc}$ measured across the DC bus capacitor, $C_{dc}$ 110) disposed electrically between a corresponding VVC 202 and the inverter 106. The VVC 202-A and 202-B may each be configured to output the DC bus voltage, $V_{dc}$ ranging between 0V and a maximum boost output voltage of the VVC 202, where the maximum boost output voltage may be based on a voltage rating of the VVC 202. Specifically, the VVC 202-A and 202-B may each output the DC bus voltage, $V_{dc}$ ranging between 0V and a maximum boost output voltage of the VVC 202 responsive to operating at a duty cycle, D less than 0.5, i.e., less than 50%. In some instances, the DC bus voltage, $V_{dc}$ at the output of the VVC 202-A and 202-B may vary according to voltage requested at the inverter 106 output and independent of the battery voltage, $V_{batt}$.

The VVC 202-A of FIG. 2A may include a first inductor $L_1$ 204 electrically in series with a negative terminal of the battery 102. The VVC 202-A may include a pair of switches $S_1$ 114a and $S_2$ 114b, a capacitor 206 in series with the first switch $S_1$ 114a, and a second inductor $L_2$ 208 in parallel with the capacitor 206 and the first switch $S_1$ 114a. The second inductor $L_2$ 208 may be configured to limit slew rate of current through the first switch $S_1$ 114a and the energy may be stored in the second inductor $L_2$ 208, when the first switch $S_1$ 114a is turned ON, and then recovered in the discharge portion of the switching cycle, e.g., when the first switch $S_1$ 114a is turned OFF.

Accordingly, the switches $S_1$ 114a and $S_2$ 114b of the VVC 202-A may be said to operate in a boost mode, when the first switch $S_1$ 114a operates independently and the second switch $S_2$ 114b is activated by a complementary signal. The switches $S_1$ 114a and $S_2$ 114b of the VVC 202-B may be said to operate in a buck mode, when the second switch $S_2$ 114b operates independently and the first switch $S_1$ 114a is activated by a complementary signal.

In some instances, responsive to the switches $S_1$ 114a and $S_2$ 114b of the VVC 202-A operating in the boost mode at a duty cycle, D less than 0.5, the VVC 202-A may be configured to output a greater range of the DC bus voltages, $V_{dc}$ that are less than the battery voltage, $V_{batt}$, as well as, output a maximum boost output voltage of the VVC 202. Thus, the VVC 202-A may be configured to output, independent of the battery voltage, $V_{batt}$, the DC bus voltage, $V_{dc}$ at the input to the inverter 106 that is approximately equal to 1.15 times the phase-phase voltage, $V_{ph}$ being requested at the inverter 106 output, thereby maintaining value of the modulation index, m being approximately equal to one (1).

The VVC 202-B of FIG. 2B may include a first inductor $L_1$ 204 electrically in series with a positive terminal of the battery 102. The VVC 202-B may include a capacitor 206 in series with the second switch $S_2$ 114b, and a second inductor $L_2$ 208 in parallel with the capacitor 206 and the second switch $S_2$ 114b. The second inductor $L_2$ 208 may be configured to limit slew rate of current through the second switch $S_2$ 114b and the energy may be stored in the second inductor $L_2$ 208, when the second switch $S_2$ 114b is turned ON, and then recovered in the discharge portion of the switching cycle, e.g., when the second switch $S_2$ 114b is turned OFF. While operation of the VVC 202-B of FIG. 2B is not separately described, it is understood that principles of operation similar to those described in reference to the VVC 202-A of FIG. 2A may apply.

Figure 4A:
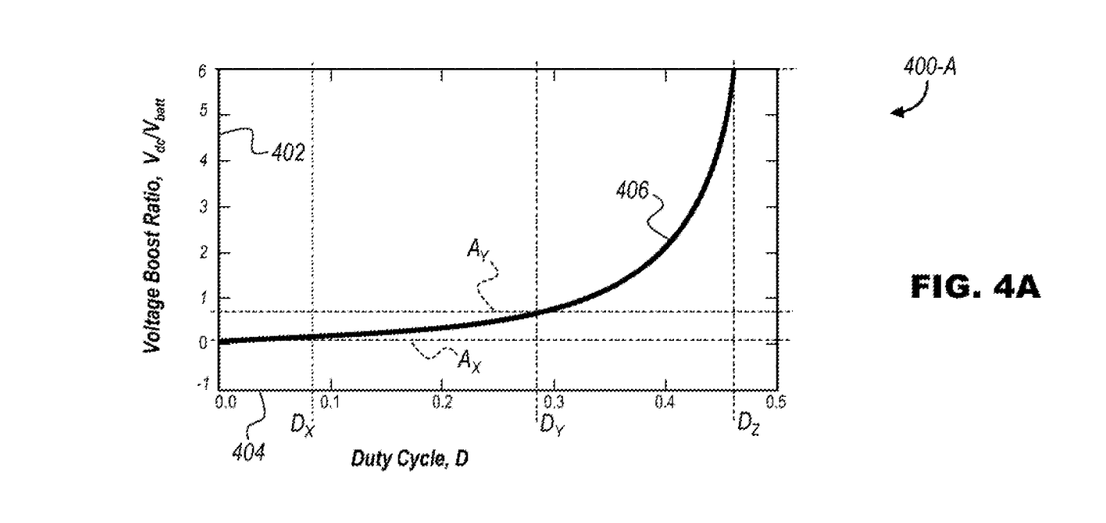
FIG. 4A is a graph illustrating expanded operating voltage range of the voltage converter of one of FIGS. 2A and 2B.

FIG. 4A illustrates a graph 400-A indicative of an expanded DC bus voltage range that varies according to requested voltage at the input of the inverter 106. The graph 400-A may illustrate the expanded DC bus voltage range of the VVC 202-A and 202-B as described in reference to at least FIGS. 2A and 2B, respectively. A vertical axis 402 of the graph 400-A may be indicative of a voltage boost ratio, A defined according to:

$$A = \frac{V_{dc}}{V_{batt}} = \frac{D}{(1-2D)} \quad (6)$$

where D may be indicative of a duty cycle of the first switch $S_1$ 114a of the VVC 202-A of FIG. 2A. A horizontal axis 404 of the graph 400-A may be indicative of a duty cycle, D of the first switch $S_1$ 114a.

Accordingly, a curve 406 may be indicative of a change in the voltage boost ratio, A with respect to a change in the duty cycle, D consistent with relative relationship of the DC bus voltage, $V_{dc}$ and the battery voltage, $V_{batt}$ described in Equation (6). Specifically, operating the switch $S_1$ 114a of the VVC 202-A at a duty cycle, D approximately equal to $$\frac{1}{3} \approx 0.333$$

may cause the voltage boost ratio, A to be approximately equal to one (1), i.e., the input voltage of the VVC 202-A may be approximately equal to the output voltage of the VVC 202-A. Additionally or alternatively, operating the switch $S_1$ 114a of the VVC 202-A at a duty cycle, D less than 0.333 may cause the voltage boost ratio, A to be less than one (1), i.e., the input voltage of the VVC 202-A may be greater than the output voltage of the VVC 202-A and the VVC 202-A may, accordingly, operate in the buck mode. Still further, operating the switch $S_1$ 114a of the VVC 202-A at a duty cycle, D greater than 0.333 may cause the voltage boost ratio, A to be greater than one (1), i.e., the output voltage of the VVC 202-A may be greater than the input voltage of the VVC 202-A and the VVC 202-A may, accordingly, operate in the boost mode.

In one example, for a given traction battery voltage, $V_{batt}$, the switch $S_1$ 114a may be operated at a first duty cycle, $D_X$, where $D_X$ may be $0<D_X<0.1$, to cause the VVC 202 to provide a first voltage boost ratio, $A_X$, where $A_X$ may be $0<A_X<0.125$. As another example, at a same traction battery voltage, $V_{batt}$, the switch $S_1$ 114a may be operated at a second duty cycle, $D_Y$, where $D_Y$ may be $D_X<D_Y<0.333$, to cause the VVC 202 to provide a second voltage boost ratio, $A_Y$, where $A_Y$ may be $A_X<A_Y<1$. As still another example, for a same traction battery voltage, $V_{batt}$, the VVC 202 voltage boost ratio may approach a predefined voltage boost ratio, e.g., six (6), when the switch $S_1$ 114a is operated at a predefined duty cycle, $D_Z$, where $0.333<D_Z<0.5$.

Said another way, the VVC 202 may operate in the buck mode, responsive to the duty cycle, D of the switch 114a being less than 0.333, and may operate in the boost mode, responsive to the duty cycle, D of the switch 114 being both greater than 0.333, i.e., 33%, and less than 0.5, i.e., 50%. Therefore, the DC bus voltage, $V_{dc}$ may be greater than or equal to the battery voltage, $V_{batt}$ while the switch 114a is operated at a duty cycle, D less than 0.5, i.e., less than 50%.

Thus, the VVC 202 may be configured to provide the DC bus voltage, $V_{dc}$, having an expanded range between the DC bus voltage value approaching zero volts and the DC bus voltage value according to a predefined maximum output voltage greater than the battery voltage, $V_{batt}$. Furthermore, the VVC 202 may provide the expanded DC bus voltage range while operating the switches 114 at a predefined duty cycle, D, e.g., D<0.5.

Figure 3A:
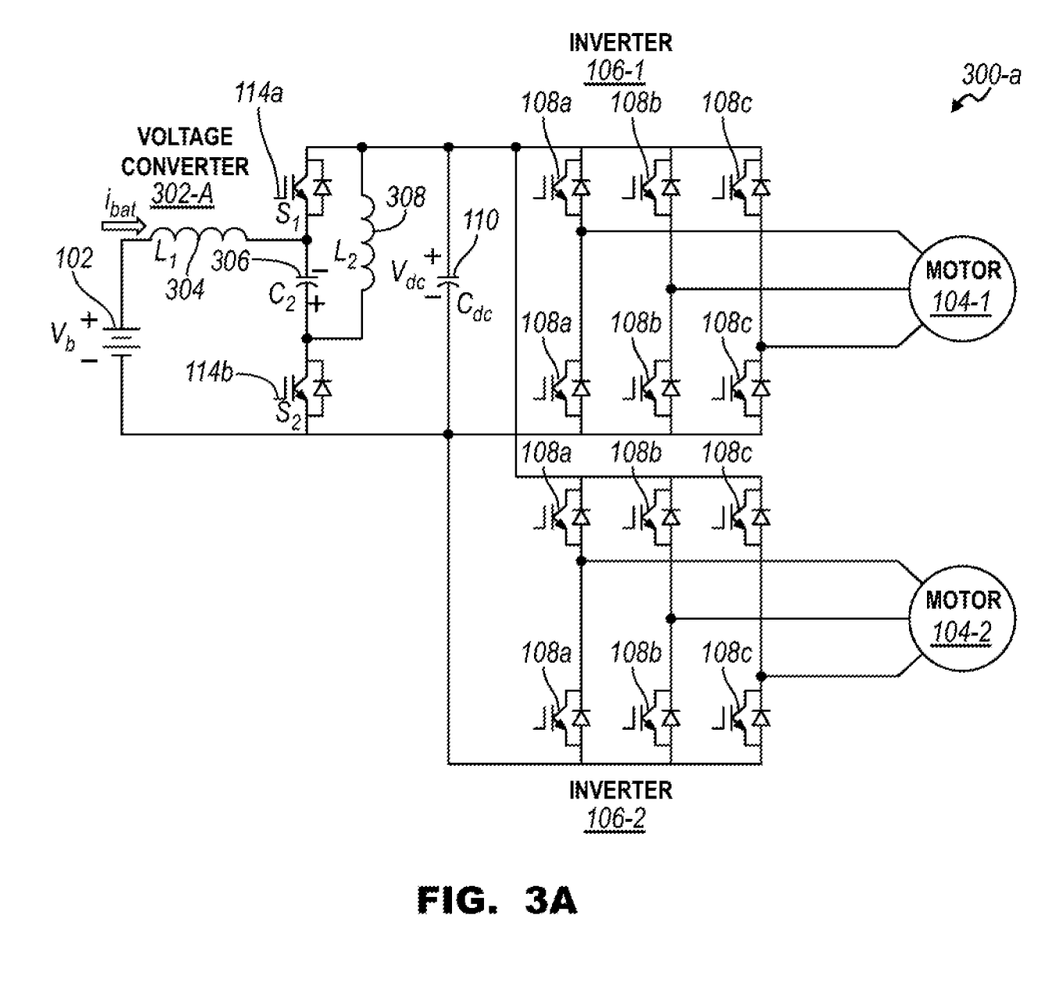
FIGS. 3A-3B are block circuit diagrams illustrating voltage converters including high voltage boost ratio.
Figure 3B:
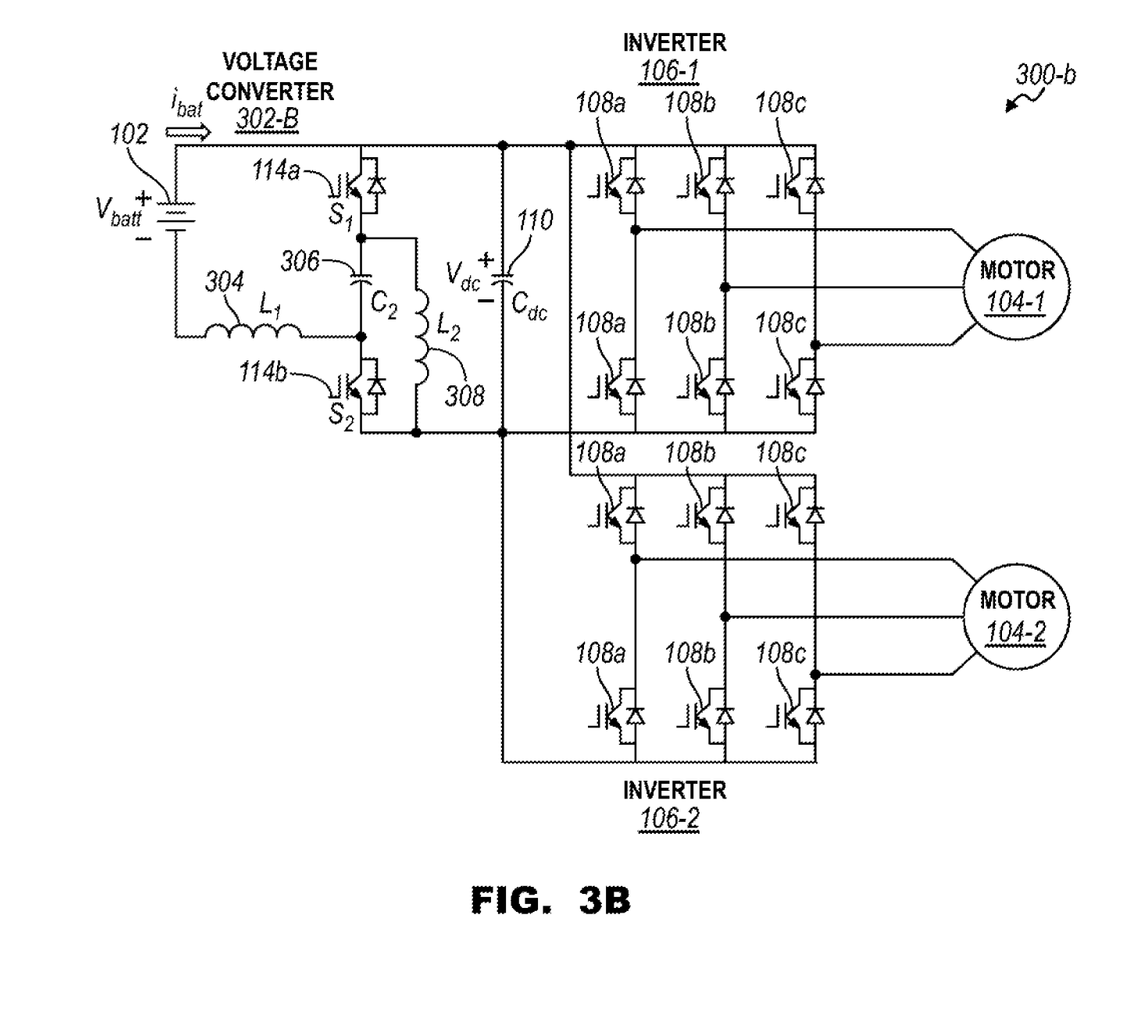

FIGS. 3A-3B illustrate example voltage converters 302 having expanded range boost voltages, that may vary according to requested voltage at the input to the inverter 106 and not according to the traction battery voltage, $V_{batt}$. The inductor may be configured to limit slew rate of current through the power switch. Accordingly, the energy may be stored in the inductor when the switch 114b is closed (turned ON) and may be recovered in the discharge portion of the switching cycle, when the switch 114b is open (turned OFF).

The voltage boost ratio, A may be defined as $$A = \frac{V_{dc}}{V_{batt}} = \frac{(1-D)}{(1-2D)} \quad (7)$$

where a duty cycle, D is indicative of the duty cycle of the switch $S_2$ 114b. According to Equation (7), the voltage boost ratio, A may be such that A>1 for all values of the duty cycle, D of the switch $S_2$ 114b. Additionally or alternatively, consistent with Equation (7), the duty cycle, D of the switch $S_2$ 114b may be such that D<0.5.

Figure 4B:
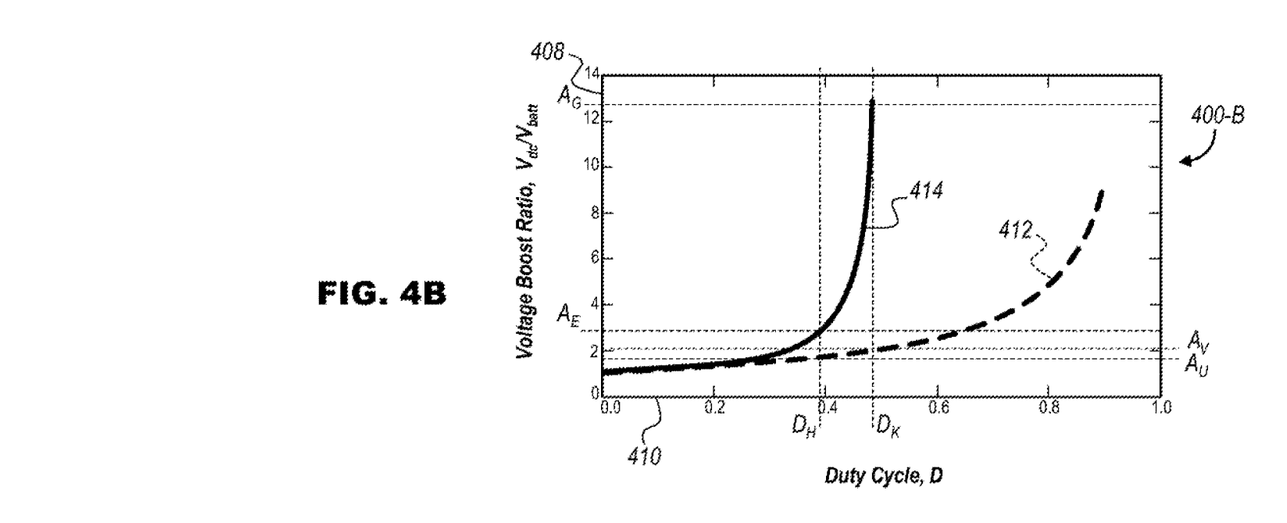
FIG. 4B is a graph illustrating operating voltage range of the voltage converter of one of FIGS. 3A and 3B.

FIG. 4B illustrates a graph 400-B indicative of an expanded voltage boost range at a predefined duty cycle, D that is less than 0.5. A vertical axis 408 of the graph 400-B may be indicative of a voltage boost ratio, A defined according to Equation (7) and a horizontal axis 410 may be indicative of a duty cycle, D of the voltage converter 302 switches 114. Accordingly, curves 412, 414 may be indicative of a change in the voltage boost ratio, A with respect to a change in the duty cycle, D. In one example, the curve 412 may illustrate the voltage boost range of the VVC 116, as described in reference to at least FIG. 1. In another example, the curve 414 may illustrate the expanded voltage boost range of the voltage converters 302-A and 302-B, as described in reference to at least FIGS. 3A and 3B, respectively, that may be achieved for a duty cycle, D less than 0.5.

In some instances, the voltage boost ratio, A of the voltage converter 302 may be much higher than that of the VVC 116. As one example, for a given traction battery voltage, $V_{batt}$ at a first duty cycle, $D_H$, e.g., $0.3<D_H<0.4$, the voltage converter 302 may be configured to provide a first voltage boost ratio, $A_E$ and the VVC 116 may be configured to provide a second voltage boost ratio, $A_U$, where $A_E$ and $A_U$ may be such that $2<A_E<4$, $1<A_U<2$, or $A_E>A_U$. As another example, for a same traction battery voltage, $V_{batt}$ at a second duty cycle, $D_K$, e.g., $0.4<D_K<0.5$, the voltage converter 302 may be configured to provide a third voltage boost ratio, $A_G$ and the VVC 116 may be configured to provide a fourth voltage boost ratio, $A_V$, where $A_G$ and $A_V$ may be such that $A_G>12$, $2<A_V<4$.

Figures 5A, 5C:
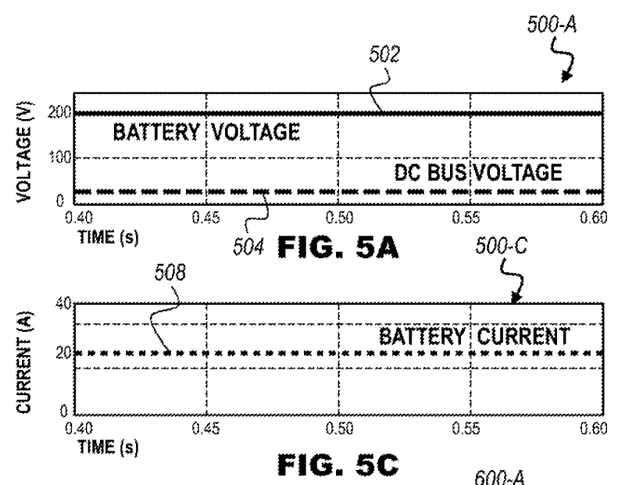
FIG. 5A is a graph illustrating DC bus voltage and input voltage of the voltage converter of one of FIGS. 2A and 2B.
FIG. 5C is a graph illustrating DC input current of the voltage converter of one of FIGS. 2A and 2B.
Figure 5B:
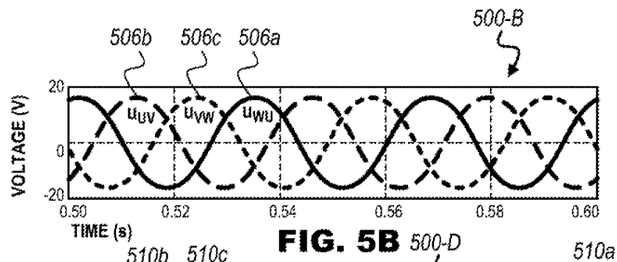
FIG. 5B is a graph illustrating an inverter AC output voltage resulting from the DC bus voltage of FIG. 5A.
Figure 5D:
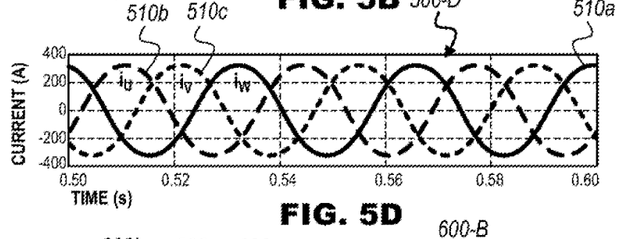
FIG. 5D is a graph illustrating an inverter AC output current resulting from the inverter output voltage of FIG. 5B.

FIGS. 5A and 5B, each illustrate a corresponding graph of voltage with respect to time, may be representative of relative behavior of the VVC 202-A and 202-B and the corresponding inverter 106 described in reference to FIGS. 2A and 2B. FIGS. 5C and 5D illustrate respective graphs 500-C and 500-D of current with respect to time and may be representative of relative behavior of the battery 102 and the inverter 106 as described in reference to the power conversion systems 200-A and 200-B illustrated in FIGS. 2A and 2B, respectively. The voltage and current waveforms illustrated in FIGS. 5A, 5B, 5C, and 5D may be a part of a single test, such that, taken together, FIGS. 5A-5D illustrate corresponding values of several parameters of different components of the power system 200-A or 200-B according to the present disclosure. Said another way, FIGS. 5A-5D may illustrate values of the several parameters captured at approximately the same time.

FIG. 5A illustrates a graph 500-A indicative of a relative relationship between a battery voltage, $V_{batt}$ 502 and a DC bus voltage, $V_{dc}$ 504 and FIG. 5B illustrates a graph 500-B indicative of the phase-to-phase (hereinafter, phase-phase) voltage, $V_{ph}$ 506 output by the inverter 106, as expressed by corresponding phase-phase voltage curves 506a, 506b, and 506c. In one example, the graph 500-B of FIG. 5B may be representative of the phase-phase voltage, $V_{ph}$ 506 output by the inverter 106 responsive to the relative values of the battery voltage, $V_{batt}$ 502 and the DC bus voltage, $V_{dc}$ 504 corresponding to those described in reference to the graph 500-A of FIG. 5A.

In one example, when value of the battery voltage, $V_{batt}$ 502 is approximately 200V and the switch $S_1$ 114a is operated at the duty cycle, D approximately equal to 0.083, i.e., 8.3%, the DC bus voltage, $V_{dc}$ 504 of approximately 20V may be generated by one of the VVC 202-A and 202-B having expanded range of the DC bus voltages, as described in reference to FIGS. 2A and 2B. Accordingly, the DC bus voltage, $V_{dc}$ 504 measured across the DC bus capacitor 110 may vary according to voltage being requested at the input to the inverter 106 and not according to the battery voltage, $V_{batt}$ 502. More specifically, for a predefined range of duty cycles, D, where D<0.333, the DC bus voltage, $V_{dc}$ 504 measured across the DC bus capacitor 110 may be less than the battery voltage, $V_{batt}$ 502.

Furthermore, the VVC 202-A and 202-B and the corresponding inverter 106 of FIGS. 2A and 2B, respectively, may operate such that the modulation index, m of the corresponding power conversion system 200-A and 200-B is approximately equal to one (1). Still further, when the DC bus voltage, $V_{dc}$ 504 is approximately 20V, as in FIG. 5A, the phase-phase voltage, $V_{ph}$ 506 output by the inverter 106 is shown to be approximately equal to 17V. Thus, consistent with Equation (1), value of the phase-phase voltage, $V_{ph}$ 506 is approximately 0.866 of the DC bus voltage, $V_{dc}$ 504 and the modulation index, m must be approximately equal to one (1).

In one example, graphs of current illustrated in FIGS. 5C and 5D may be indicative of relative behavior of the battery 102 and the inverter 106 when voltage values correspond to those of FIG. 5A, e.g., the battery voltage, $V_{batt}$ 502 and the DC bus voltage, $V_{dc}$ 504, and FIG. 5B, e.g., the phase-phase voltage, $V_{ph}$ 506. Specifically, when value of the battery voltage, $V_{batt}$ 502 is approximately 200V, as in FIG. 5A, one of the voltage converters 202-A, 202-B having expanded DC bus voltage range may generate the DC bus voltage, $V_{dc}$ 504 that is approximately 20V, as in FIG. 5A, to cause the inverter 106 phase-phase voltage, $V_{ph}$ 506 to be approximately 17V, as in FIG. 5B, and the phase current, $I_{ph}$ 510 output by the inverter 106 to be approximately 215 A, as in FIG. 5D, while the battery current, haft 508 is approximately 21.5 A, as in FIG. 5C. This may be consistent with Equation (4), such that, responsive to each of the battery voltage, $V_{batt}$, the modulation index, m, and the DC bus voltage, $V_{dc}$ being constant, the battery current, haft 508 may be proportional to the phase current, $I_{ph}$ 510 output by the inverter 106.

Figures 6A, 6C:
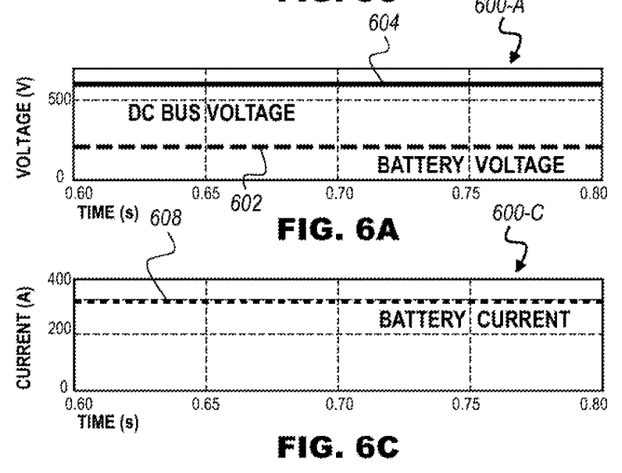
FIG. 6A is a graph illustrating DC bus voltage and input voltage of the voltage converter of one of FIGS. 2A and 2B.
FIG. 6C is a graph illustrating DC input current of the voltage converter of one of FIGS. 2A and 2B.
Figures 6B, 6D:
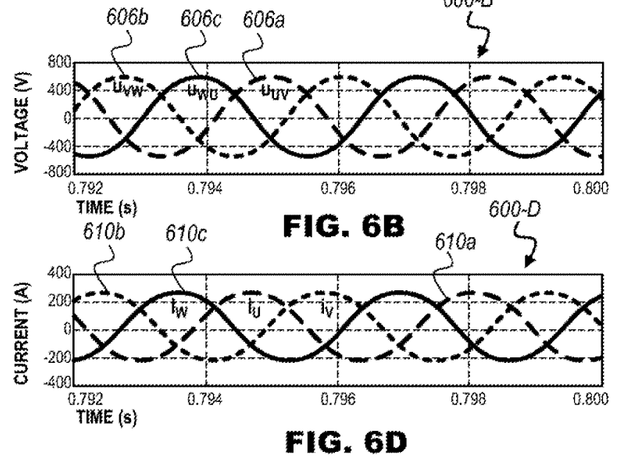
FIG. 6B is a graph illustrating an inverter AC output voltage resulting from the DC bus voltage of FIG. 6A.
FIG. 6D is a graph illustrating an inverter AC output current resulting from the inverter AC output voltage of FIG. 6B.

FIGS. 6A and 6B, each illustrate a corresponding graph of voltage with respect to time, may be representative of relative behavior of the variable voltage converters 202 and the inverters 106 as described in reference to FIGS. 2A and 2B. FIG. 6A illustrates a graph 600-A indicative of a relative relationship between a battery voltage, $V_{batt}$ 602 and a DC bus voltage, $V_{dc}$ 604 and FIG. 6B illustrates a graph 600-B indicative of the phase-phase voltage, $V_{ph}$ 606 output by the inverter 106. In one example, the graph 600-B of FIG. 6B may be representative of the phase-phase voltage, $V_{ph}$ 606 output by the inverter 106 responsive to the relative values of the battery voltage, $V_{batt}$ 602 and the DC bus voltage, $V_{dc}$ 604 corresponding to those described in reference to the graph 600-A of FIG. 6A.

In one example, when value of the battery voltage, $V_{batt}$ 602 is approximately 200V, the DC bus voltage, $V_{dc}$ 604 of approximately 600V may be generated by one of the voltage converters 202-A, 202-B having expanded range boost voltages, as described in reference to FIGS. 2A and 2B. Accordingly, the DC bus voltage, $V_{dc}$ 604 may provide expanded boost voltage at the input to the inverter 106 while maintaining the modulation index, m equal to approximately one (1). Accordingly, the phase-phase voltage, $V_{ph}$ 606 output by the inverter 106 may be approximately equal to 520V, or 0.866 of the DC bus voltage, $V_{dc}$ 604.

FIGS. 6C and 6D illustrate respective graphs 600-C and 600-D of current with respect to time, may be representative of relative behavior of the battery 102 and the inverters 106 described in reference to the power conversion systems 200-A and 200-B illustrated in FIGS. 2A and 2B, respectively. Furthermore, the voltage and current waveforms illustrated in FIGS. 6A, 6B, 6C, and 6D may be a part of a single test, such that, taken together, FIGS. 6A-6D illustrate corresponding values of several parameters of different components of the power system 200-A or 200-B according to the present disclosure. Said another way, FIGS. 6A-6D may illustrate values of the several parameters captured at approximately the same time.

In one example, graphs of current illustrated in FIGS. 6C and 6D may be indicative of relative behavior of the battery 102 and the inverter 106 when voltage values correspond to those of FIG. 6A, e.g., the battery voltage, $V_{batt}$ 602 and the DC bus voltage, $V_{dc}$ 604, and FIG. 6B, e.g., the phase-phase voltage, $V_{ph}$ 606 output by the inverter 106. Specifically, when value of the battery voltage, $V_{batt}$ 602 is approximately 200V, as in FIG. 6A, one of the VVC 202-A and 202-B having expanded boost voltage range may generate the DC bus voltage, $V_{dc}$ 604 that is approximately 600V, as in FIG. 6A, to cause the phase-phase voltage, $V_{ph}$ 606 output by the inverter 106 to be approximately 520V, as in FIG. 6B, and the phase current, $I_{ph}$ 610 output by the inverter 106 to be approximately 185 A, as in FIG. 6D, while battery current, haft 608 is approximately 320 A, as in FIG. 6C.

The processes, methods, or algorithms disclosed herein may be deliverable to or implemented by a processing device, controller, or computer, which may include any existing programmable electronic control unit or dedicated electronic control unit. Similarly, the processes, methods, or algorithms may be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms may also be implemented in a software executable object. Alternatively, the processes, methods, or algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A system comprising:
   a bus;
   a variable voltage converter (VVC)
      including a switch in series with a capacitor, and an inductor in parallel with the capacitor and switch, and
      configured such that operation of the switch in boost mode over a duty cycle range from 0 to less than 0.5 results in a corresponding voltage output to the bus from 0 to a maximum of the VVC; and
   a battery connected to power the VVC, wherein the VVC further includes another inductor connected between a terminal of the battery and the switch.

2. The system of claim 1, wherein the VVC includes another switch in series with the switch and the boost mode includes controlling the switches in a complimentary fashion.

3. The system of claim 1 further comprising an inverter connected to receive voltage output to the bus and to generate phase voltage approaching one-half of the voltage output to the bus such that a modulation index of the inverter approaches 1.

4. The system of claim 1, wherein the voltage output includes values less than voltage of the battery.

5. The system of claim 1 further comprising an inverter connected to receive voltage output to the bus and to generate phase current output in a range independent of current output of the battery.

6. A system comprising:
   a battery;
   an inverter; and
   a variable voltage converter (VVC) connected between the battery and inverter, the VVC including a pair of switches, a capacitor in series with one of the switches, and an inductor in parallel with the capacitor and the one of the switches, and configured such that operation of the switches in boost mode over a duty cycle range from 0 to less than 0.5 results in a corresponding voltage output to the inverter in a range from 0 to a maximum of the VVC, wherein the inverter is configured to generate phase voltage approaching one-half of the voltage output to the inverter such that a modulation index of the inverter approaches 1.

7. The system of claim 6, wherein the boost mode includes controlling the switches in a complimentary fashion.

8. The system of claim 6, wherein the inverter is further configured to generate phase current output in a range independent of current output of the battery.

9. A system comprising:
   a bus;
   a variable voltage converter (VVC)
      including a pair of switches, a capacitor in series with one of the switches, and an inductor in parallel with the capacitor and the one of the switches, and
      configured such that operation of the switches in boost mode over a duty cycle range from 0 to less than 0.5 results in a corresponding voltage output to the bus from battery voltage to a maximum of the VVC;
   an inverter connected to receive voltage output to the bus and to generate phase voltage to power an electric machine; and
   a battery connected to power the VVC such that the phase voltage generated by the inverter approaches voltage of the battery, wherein the inverter is further configured to generate phase current output independent of current output of the battery such that a power factor of the inverter approaches 1.

10. The system of claim 9, wherein the boost mode includes controlling the switches in a complimentary fashion.

* * * * *